June 8, 1926.  
R. S. THOMPSON  
EDUCATIONAL CHART  
Filed Sept. 29, 1924

R. S. THOMPSON

EDUCATIONAL CHART

Filed Sept. 29, 1924    2 Sheets-Sheet 2

1,587,928

Inventor

R. S. Thompson.

By Lacey & Lacey, Attorneys

Patented June 8, 1926.

1,587,928

UNITED STATES PATENT OFFICE.

RAY S. THOMPSON, OF HANCOCK, MINNESOTA.

EDUCATIONAL CHART.

Application filed September 29, 1924. Serial No. 740,557.

This invention relates to educational charts and more particularly to a chart for use by teachers in propounding problems in arithmetic.

Ordinarily, the teacher is required to write the various problems to be solved by the class or classes of pupils, upon the blackboard, and after the problems have been presumably solved by the pupils, their work papers are collected and are inspected by the teacher and corrected. This consumes considerable time and labor on the part of the teacher, which might be more profitably spent. Therefore, it is one of the important objects of the present invention to provide a chart which may be employed by a teacher in instructing various grades in the several arithmetical processes without the necessity of writing upon the blackboard the various problems which are to be solved, and in this connection, the invention contemplates the provision of a chart embodying such characteristics that a vast number of problems may be presented to the pupils for solution by an extremely simple and convenient adjustment of the component parts of the chart, and by which adjustment the chart, when suspended in view of the pupils of one or more grades, will furnish them with a sufficient number of problems to engage their attention for a considerable period of time, thus permitting the teacher, without further attention either to the chart or to the class or classes, under her care, to engage in other work as, for example, preparation for instruction in some other subject.

Another object of the invention is to provide a chart which when presented with one face to the class or classes, may be employed in propounding problems of a simple nature which are to be solved mentally and the solutions given orally, the chart being so constructed that when its other face is presented to a class or classes, there will be presented to the said class or classes, problems of a more difficult nature which cannot be conveniently solved without resorting to writing, so that the chart as a whole is adapted for employment in teaching the various arithmetical processes to pupils of all grades.

Another object of the invention is to so construct and arrange the component parts of the chart and so arrange the various numbers upon the component parts thereof, that the pupils will be caused to learn their lessons through the exercise of their mental functions rather than by rote, as is the case in the memorization of the multiplication tables.

Another very important object of the invention is to so construct the chart and arrange the numbers formed by the component parts thereof, as well as the signs indicating the arithmetical processes to be followed, that different groups of numbers may constitute, at various times, multiplicands, multipliers, dividends, divisors, minuends, and subtrahends, according to the arithmetical signs displayed to the view of the pupils in association with the several groups of numbers likewise presented to view.

In the accompanying drawings:

Figure 1 is a view in elevation of the chart looking at one face thereof.

Figure 2 is a similar view looking at the other face of the chart.

Figure 3:
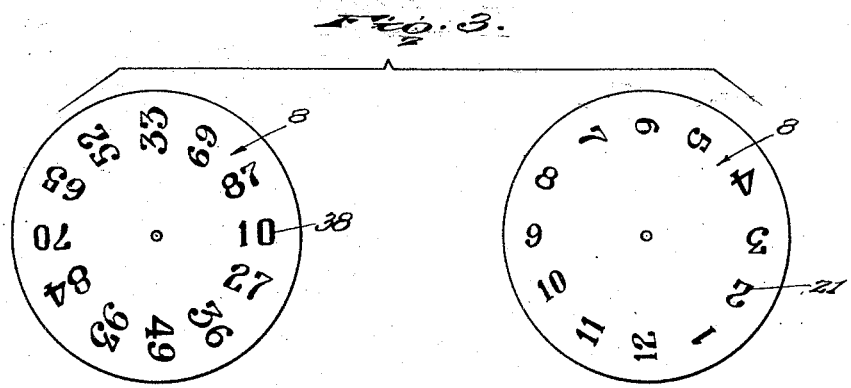
Figure 3 is a group view illustrating the opposite faces of one of the number discs of the chart.

The chart embodying the invention includes, in its structure, two face plates, one of which is indicated by the numeral 1 and the other by the numeral 2. These plates may be of any suitable material such, for example, as fiber board, metal, or the like, and each plate preferably has a straight lower margin indicated by the numeral 3, vertical side margins indicated by the numeral 4, and an arcuate upper margin indicated by the numeral 5, and the said plates are assembled with their marginal portions substantially in registration and are united by eyelet rivets indicated by the numeral 6, located at the lower corners of the plates, and by a similar rivet 7 located near the arcuate margins 5 of the plates and substantially in the vertical median line of the chart, whereby the chart may be suspended from a hook, nail, or other suitable device, the removal of the chart from its suspension means permitting of the chart being reversed so as to present the face of either of the plates to the pupils receiving instruction.

Disposed between the plates 1 and 2, are number discs indicated one by the numeral 8, another by the numeral 9, and the third by the numeral 10. Pivot pins 11, 12 and 13 are secured through the plates 1 and 2 at appropriate points and axially through the discs 8, 9 and 10, respectively, and by reference to Figures 1 and 2 of the drawings, it will be observed that the pivot pins 11 and 12 are located in horizontal alinement at the upper portion of the chart and are symmetrically located with relation to the marginal portions of the said chart, the pivot pin 13 being located near the lower margin of the chart and in substantially vertical alinement with the eyelet 7, the pivot pins 11, 12 and 13 occupying relative positions representing the corners of an imaginary equi-lateral triangle. In this manner, the discs 8, 9 and 10 are supported between the plates 1 and 2 for independent and selective rotary adjustment, and for this purpose the discs are of such diameter and so arranged that the peripheral portions of the discs 8 and 9 will project a short distance beyond the arcuate upper marginal portions 5 of the plates 1 and 2, as indicated respectively by the numerals 14 and 15, whereas the peripheral portion of the disc 10 at the lower side of the disc, is presented within a recess 16 formed in the lower margins 3 of the plates 1 and 2, this peripheral portion of the said disc 10 being indicated by the numeral 17. By means of this arrangement, the peripheral portions of the several discs may be engaged by the fingers and the discs rotatably adjusted.

The relatively adjacent peripheral portions of the discs 8 and 9 are positioned relatively close to each other, and the plate 1 is formed, in horizontal alinement with the pivot pins 11 and 12, with preferably circular openings 18 and 19, the said plate 1 being further formed, at the vertical median line of the plate and between the pivot pin 13 and opposite the upper marginal portion of the disc 10, with a preferably circular opening indicated by the numeral 20. Thus, the peripheral portions of the faces of the discs 8, 9 and 10 are exposed respectively through the openings 18, 19 and 20 in the plate 1, and these portions of the said discs respectively bear numbers indicated by the numerals 21 and 22, and signs of arithmetical processes indicated by the numeral 23.

By reference now to Figure 3 of the drawings, and more particularly to the right hand view in said figure, it will be observed that the disc 8 bears an annular series of the numbers 21 ranging in numerical order from "1" to "12" so that by rotating the said disc 8, any one of these numbers may be presented to view through the opening 18. The left hand view in Figure 3 represents the other face of the disc 8 which likewise bears a plurality of numbers arranged in an annular series but this face of the said disc 8 as well as the corresponding faces of the discs 9 and 10, will not be specifically referred to at the present time in order to avoid confusion. That face of the disc 9 the marginal portion of which is to be exposed through the opening 19, and which face of the disc is shown in the right hand view of Figure 4, bears an annular series of the numbers indicated by the numeral 22, and these numbers range in numerical order from "1" to "9" inclusive, and between the numbers "1" and "9" the said portion of the disc bears the sign of multiplication, indicated by the numeral 24, the sign of addition indicated by the numeral 25, and the sign of subtraction, indicated by the numeral 26. At this point it will be evident that by rotatably adjusting the disc 9, the numbers comprising the series 22, as well as the arithmetical signs 24, 25 and 26, may be selectively brought to view within the bounds of the opening 19.

Figure 5:
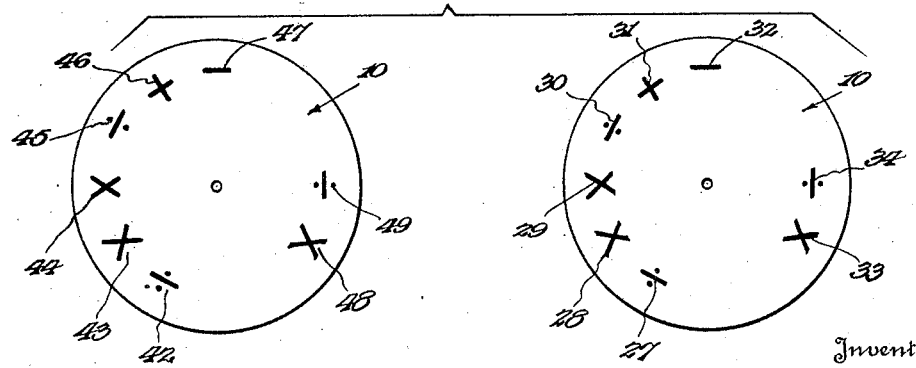
Figure 5 is a similar view illustrating the opposite faces of the disc which bears the signs indicating the arithmetical processes to be followed.

The right hand view of Figure 5 of the drawings, illustrates that face of the disc 10, the peripheral portion of which is to be exposed through the opening 20, and this face of the disc bears upon its said portion a substantially semi-annular series of arithmetical signs comprising the sign of division, indicated by the numeral 27, the sign of multiplication indicated by the numeral 28, another sign of multiplication indicated by the numeral 29, another sign of division indicated by the numeral 30, the sign of addition indicated by the numeral 31, and the sign of subtraction indicated by the numeral 32. This portion of the said disc 10 likewise bears, opposite the sign of division 30, the sign of multiplication indicated by the numeral 33, and, diametrically opposite the sign of multiplication indicated by the numeral 29, the sign of division indicated by the numeral 34. At this point it will be evident that by rotating the disc 10, the arithmetical signs 27 to 33 may be rotatably brought to view within the bounds of the opening 20.

The face of the plate 1 bears an annular series of numbers indicated in general by the numeral 35 and these numbers range from "0" to "12." These numbers are indiscriminately arranged and by reference to Figure 1, it will be observed that some of the numbers are duplicated, some appear only once, and some appear three times. The purpose of this indiscriminate arrangement of the numbers comprising the series 35, will be presently set forth. By reference to said Figure 1, it will be observed that the series of numbers 35 is concentric to a center to which the arcuate margins 5 of the plates 1 and 2 are likewise concentric.

The chart as thus far described, is intended to be employed in presenting to the pupils problems in arithmetic involving the various processes of the science and which problems are of a simple nature and capable of being mentally solved and the solution thereof given orally to the teacher by the pupil. In utilizing the chart, under these conditions, the chart will be suspended upon the wall with the face of the plate 1 in view of the pupils, and assuming that the discs 9 and 8 have been rotatably adjusted to present within the openings 19 and 18 respectively, the numbers "7" and "8" of the series of numbers 22 and 21, which, combined, form the number "78", the teacher may then rotatably adjust the disc 10 so as to present to view, within the opening 20, the sign of division heretofore referred to by the numeral 23 and which may be either of the signs 27, 30 or 34 shown in the right hand view of Figure 5. Then, by pointing to any desired one of the numbers of the series 35, the teacher may request any individual pupil to solve the problem of dividing "78" by the particular number of the series 35 pointed out, the numbers or digits upon the discs 9 and 8, when combined, representing the dividend, the arithmetical sign upon the disc 10 presented within the opening 20, representing the process which is to be followed, and the number of the series 35 pointed to by the teacher, representing the divisor. The pupil mentally solving the problem, will then respond orally by stating the quotient. Of course, by further adjusting the disc 10, other arithmetical signs may be brought to view within the bounds of the opening 20 and thus the various arithmetical processes may be followed out, for example, without disturbing the adjustment of the discs 9 and 8, and by the teacher pointing to selected numbers of the series 35. At this point, it will be evident that by variously relatively adjusting the discs 9 and 8, and likewise adjusting the disc 10, to present various arithmetical process signs, the composites of the numbers of the series 21 and 22 upon the discs 8 and 9 may constitute multiplicands, dividends, minuends, and numbers to which other numbers are to be added, so that all of the arithmetical processes may be carried out through said adjustments. In this manner, the teacher, without being required to write examples upon the blackboard, may present the examples or problems to the pupils, and it will be obvious that a great number of combinations or, more specifically, a great number of problems, may be presented for solution through adjustment of the several discs.

As heretofore stated, the numbers of the series 35, which numbers may constitute multipliers, divisors, subtrahends, or numbers to be added to the numbers displayed within the openings 18 and 19, are indiscriminately arranged and this is done to preclude any likelihood of any pupil learning the various problems, which may be presented to him, by rote, rather than by the exercise of his mental faculties.

In addition to the possible combinations indicated above, as regards the use of the chart as thus far described, it is evident that the disc 9 may be rotatably adjusted to display any selected one of the arithmetical signs 24, 25 or 26, and the disc 8 may be rotated to display any one of the series of numbers 21, thus indicating the process by which the said number of the series 21 is to be employed in connection with the pointed out one of the series of numbers 35. In thus employing the chart, the disc 10 will, of course, be rotated to expose one of the vacant spaces between the division sign 27 and multiplication sign 33 or the space between the subtraction sign 32 and the sign of division 34.

Figure 4:
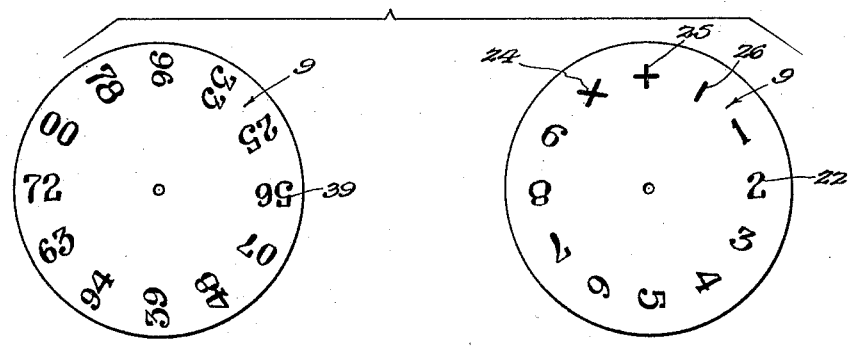
Figure 4 is a similar view illustrating the opposite faces of another of the number discs.

The plate 2 of the chart is formed, approximately opposite the openings 18 and 19 of the plate 1, and in horizontal alinement between the pivot pins 11 and 12, with preferably rectangular openings indicated one by the numeral 36 and the other by the numeral 37. As illustrated in Figure 2 of the drawings, the discs 8 and 9, in their rotative adjustment, are adapted to have the peripheral portions of their other faces exposed to view through the openings 36 and 37 respectively. The left hand view of Figure 3 illustrates the other face of the disc 8 and the peripheral portion of the said face bears an annular series of numbers indicated by the numeral 38 and which numbers may be arbitrarily selected. These numbers are preferably of two digits each and, through rotation of the said disc 8, with the plate 2 of the chart exposed to view, any one of the series of numbers may be brought into view within the bounds of the opening 36. The left hand view of Figure 4 illustrates the other face of the disc 9, and the peripheral portion of the face of this disc likewise bears an annular series of numbers indicated by the numeral 39, and which numbers may be arbitrarily selected and arbitrarily arranged, and each of which preferably comprises a combination of two digits. It will be evident at this point that the numbers of the series 39 may be selectively brought to view within the bounds of the opening 37 by rotatably adjusting the said disc 9. The plate 2 is formed with preferably rectangular openings 40 and 41 which are located in the vertical median line of the plate and equi-distantly spaced above and below the pivot pin 13 for the disc 10, the spacing being such that the peripheral portion of the other face of the said disc 10 will be exposed to view through said openings 40 and 41. The said other face of the disc 10 is illustrated in the left hand view of Figure 5 and the same bears an approximately semi-circular series of arithmetical process signs, there being in the order named, a sign of division indicated by the numeral 42, a sign of multiplication, indicated by the numeral 43, another sign of multiplication indicated by the numeral 44, another sign of division indicated by the numeral 45, a sign of addition indicated by the numeral 46, and a sign of subtraction indicated by the numeral 47. This portion of the said face of the disc 10 likewise bears, opposite the sign of division 45, the sign of multiplication 48, and opposite the sign of multiplication 44, the sign of division 49. By thus arranging the arithmetical process signs 42 to 47 inclusive, any one of the signs may be brought opposite the opening 40 by rotating the disc 10, a portion of the blank peripheral portion of the face of the disc being at such time presented at the opening 41, or any one of the said signs may be brought into view at the opening 41 and a blank portion of the disc at the same time exposed at the opening 40, indicating in each instance that only one arithmetical process is to be followed.

Likewise, the disc 10 may be so adjusted that the sign of division 49 will be presented to view within the bounds of the opening 40, and the sign of multiplication 44, located diametrically opposite thereto upon the face of the said disc 10, will be presented to view within the bounds of the opening 41. On the other hand, the disc may be adjusted so as to bring the sign of multiplication 48 within the opening 40 and the sign of division 45 within the opening 41.

The face of the plate 2, at the left hand side of the vertical median line of the plate, bears two columns of numbers of two digits each, indicated by the numeral 50, and the said plate likewise bears, at the right hand side of the vertical median line, two columns of numbers of three digits each, indicated by the numeral 51.

At this point it will be understood, and particularly by reference to Figure 2 of the drawings, that the discs 8 and 9 may be rotatably adjusted, when the plate 2 of the chart is exposed to view, so as to bring into position within the openings 36 and 37, selected ones of the series of numbers 38 and 39 to compose a number of four digits which number may serve as a multiplicand, a dividend, a minuend, or a number to which another number is to be added, the disc 10 being rotatably adjusted so as to indicate which of the arithmetical processes is to be followed. In the adjustment of the disc 10, the arithmetical process signs upon the face of the said disc which are exposed through the opening 40, indicate an arithmetical process to be performed in connection with the composite number presented to view through the openings 36 and 37, in conjunction with one or more of the numbers in the column 50, whereas the signs presented to view through the opening 41 bear relation to the numbers contained in the column 51. Therefore, the teacher may assign to one grade of pupils examples in which the numbers in the column 50 may constitute multipliers, divisors, subtrahends, or numbers to be added to the composite number presented to view through the openings 36 and 37, and may assign to a higher grade of pupils, problems to be solved in which the numbers of the column 51 may constitute multipliers, divisors, subtrahends, or numbers to be added to the said composite number. On the other hand, if only one class is working in arithmetic, the disc 10 may be so adjusted as to expose in either of the openings 40 or 41, the arithmetical process sign which is to be followed by the class to which the columns of numbers 50 are assigned or the class to which the columns of numbers 51 are assigned. Thus, a great number of combinations may be produced presenting to an individual class or grade, or to two classes or grades of pupils, problems to be solved in writing, the problems in this case being too difficult for the ordinary pupil so that this employment of the chart is intended primarily for pupils of higher grades.

Having thus described the invention, what I claim is:

1. An educational device comprising a plate, discs mounted on the plate, certain discs bearing numbers and another disc bearing arithmetical symbols, and a cover plate having an opening for each of the number bearing discs to expose a number thereof, and having two openings for the symbol bearing disc to simultaneously expose two symbols at diametrically opposite points, and having two sets of numbers, a selected number of either set being adapted to be treated by the exposed disc number according to the selected exposed symbols.

2. In an educational chart for presenting problems in arithmetic, a plate having sight openings therein horizontally oppositely arranged relatively close to each other and provided with other sight openings relatively spaced an appreciable distance, the plate bearing a column of numbers associated with one of the last mentioned sight openings at one side thereof and a second column of numbers of a greater number of digits associated with the other one of the last mentioned sight openings at the other side thereof, discs rotatable with relation to the plate and bearing each an annular series of numbers adapted, in the rotative adjustment of the said discs to be selectively presented to view within the bounds of the respective ones of the first mentioned sight openings, and a disc rotatable with relation to the said plate and bearing a series of signs of arithmetical processes arranged, in the rotative adjustment of the last mentioned disc, to be presented at one or another or both of the last mentioned sight openings, the digits of the numbers presented at the first mentioned sight openings constituting a composite number, and the arithmetical signs presented at the second mentioned sight openings indicating the arithmetical process or processes to be followed in connection with said composite number and individual numbers of the first and second mentioned series upon said plate.

In testimony whereof I affix my signature.

RAY S. THOMPSON. [L. S.]